United States Patent [19]

Palm

[11] Patent Number: 4,770,073

[45] Date of Patent: * Sep. 13, 1988

[54] SOCKET WRENCH EXTENSION

[76] Inventor: Bernhard Palm, 17420 Continental Dr., Brookfield, Wis. 53005

[*] Notice: The portion of the term of this patent subsequent to Aug. 27, 2002 has been disclaimed.

[21] Appl. No.: 17,229

[22] Filed: Feb. 20, 1987

[51] Int. Cl.$^4$ .......................... B25B 23/16; B25G 1/04
[52] U.S. Cl. .................. 81/177.85; 81/177.2; 403/329; 403/361
[58] Field of Search ............... 81/177.85, 177.1, 177.2, 81/177.9; 403/325, 328, 358, 361, 329

[56] References Cited

U.S. PATENT DOCUMENTS

| | | | |
|---|---|---|---|
| 2,963,930 | 12/1960 | Clothier | 81/177.2 |
| 3,260,541 | 7/1966 | Sadler | 403/325 |
| 4,464,077 | 8/1984 | Herchenbach | 403/325 |
| 4,537,100 | 8/1985 | Palm | 81/177.85 |
| 4,589,308 | 5/1986 | Palm | 81/177.85 |

Primary Examiner—Frederick R. Schmidt
Assistant Examiner—Bradley I. Vaught
Attorney, Agent, or Firm—Bayard H. Michael

[57] ABSTRACT

A push-on/quick release locking arrangement is mounted on a socket wrench extension or driver having a cylindrical body with a square drive end. An inclined transverse bore in the drive end intersects opposed flat faces of the drive end and lock balls are mounted in the bore for movement between a "lock" position and a "release" position. In the "lock" position one ball projects from the end of the bore nearest the end of the drive end to engage a cooperating cavity in the drive recess of a socket. In the "release" position the balls lie within the cross section of the drive end. There is an axial groove in the flat face intersected by the end of said bore further from the end of the drive end. A cylindrical grip sleeve is mounted for slideable movement on the cylindrical body of the extension. The end of said sleeve remote from the drive end is turned inwardly and an integral control tab projects from the other end of the sleeve. A spring is captured inside the sleeve between the inturned end and an inside shoulder formed in the sleeve. A coil of the spring is captured in a groove in the cylindrical body so the spring bears against the sleeve to bias the sleeve towards the drive end and the tab projecting from the sleeve fits into the axial groove and overlies the lock ball when the inturned end of the sleeve abuts the spring coil.

2 Claims, 1 Drawing Sheet

U.S. Patent   Sep. 13, 1988   4,770,073
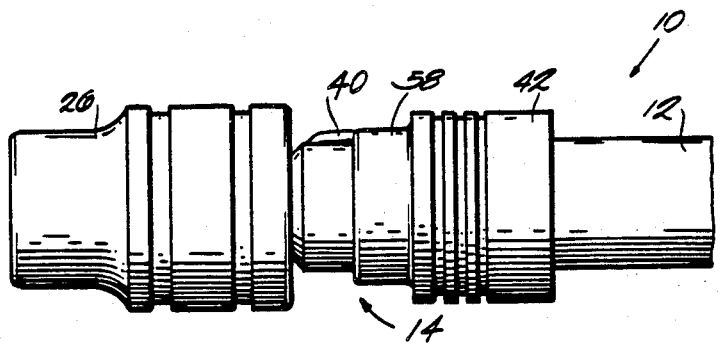
Fig. 1
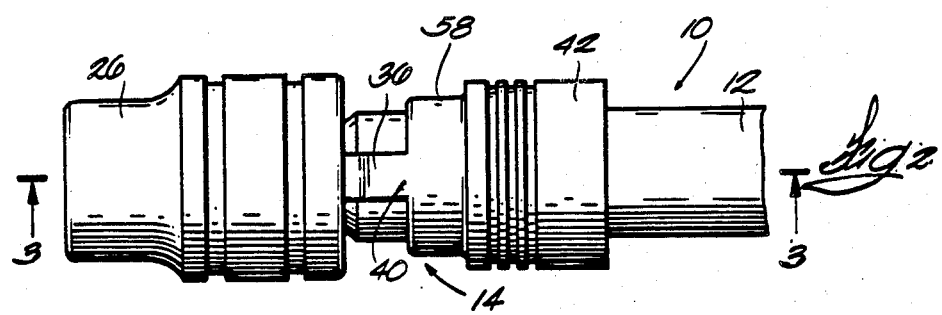
Fig. 2
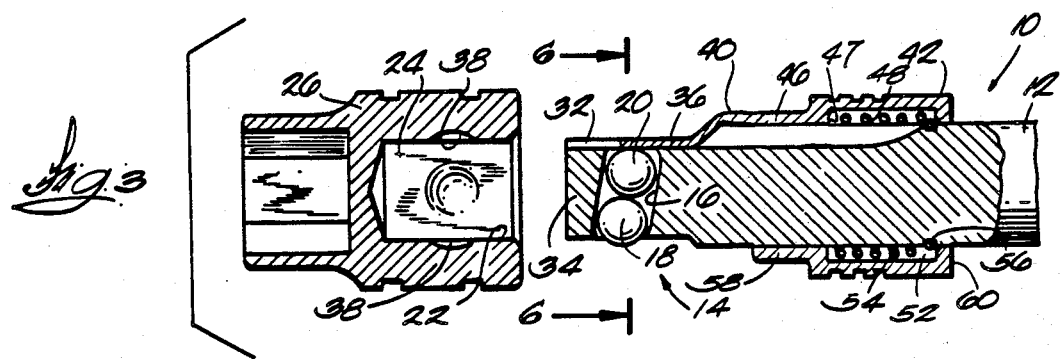
Fig. 3
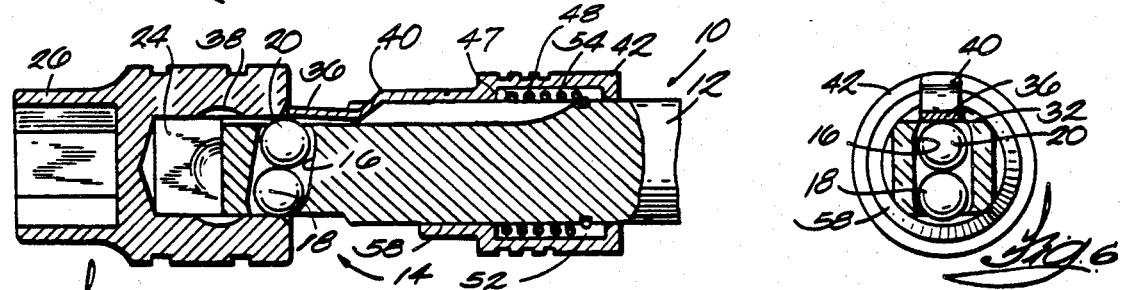
Fig. 4
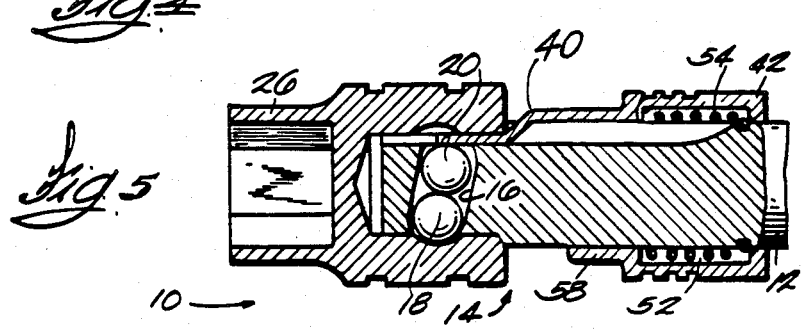
Fig. 5
Fig. 6

SOCKET WRENCH EXTENSION

BACKGROUND OF THE INVENTION

My U.S. Pat. No. 4,537,100 shows a socket wrench extension with a push-on/quick release locking arrangement. While that design provided a function not previously available, the construction called for some costly production operations. My U.S. Pat. No. 4,589,308 reduced the cost of the U.S. Pat. No. 4,537,100 design. This invention further simplifies the extension with consequent cost reduction.

SUMMARY OF THE INVENTION

This invention provides a push-on/quick release locking arrangement for a socket wrench extension or driver having a cylindrical body with a square drive end. Transverse offset bores or an inclined bore through the drive end intersects opposed flat faces. Lock balls are mounted in the bore for movement between a lock position in which one of the balls projects from one end of the bore far enough to engage a cooperating cavity in the drive recess of a tool and a release position in which the ball lie within the cross section of the drive end. The end of the bore with the projecting ball is closer to the end of the drive end than is the other end of the bore. An axial groove is provided in the flat face intersected by the other end of said bore. A cylindrical sleeve is mounted on the cylindrical body of the extension. The end of the sleeve remote from the drive end is turned inwardly and an integral control tab projects from the end of the sleeve closer to the drive end. A spring having a coil captured in a groove in the cylindrical body bears against the sleeve to bias the sleeve towards the drive end, and the tab projects from the sleeve into the axial groove to overlie the ball when said inturned end of said sleeve abuts said coil.

This invention is an improvement over the slider (sleeve) construction shown in my U.S. Pat. No. 4,589,308 in that the control tab is part of and integral with the "front" end of a sleeve which is turned in at the "rear" end to capture the biasing spring inside the sleeve. The present sleeve per se can be roll formed, machined or molded and includes an inside "front" shoulder against which the spring seats.

BRIEF DESCRIPTION OF THE DRAWINGS

FIG. 1 is a "side" elevation of the present driver or extension connected to a wrench socket.

FIG. 2 is an elevation rotated 90° from FIG. 1.

FIG. 3 is a section on line 3—3 of FIG. 2 but with the driver and socket separated.

FIG. 4 shows the driver entering the recess in the socket with the sleeve and slider pushed back from the FIG. 3 position.

FIG. 5 is similar to FIG. 4 but the parts are not connected.

FIG. 6 is a section on line 6—6 in FIG. 3.

DETAILED DESCRIPTION OF THE DRAWINGS

The extension can be a driver on a wrench and have no extension function. Therefore, the extension can be called a driver and the terms are used interchangeably. The driver 10 has a solid round shaft 12 of the desired length. One end of the driver is provided with a recessed driven member (not shown) which is connected to and driven by the customary handle. The other end of the driver has a square drive end 14 dimensioned to fit one of the standard socket sizes (such as $\frac{1}{4}''$, $\frac{3}{8}''$, $\frac{1}{2}''$, $\frac{3}{4}''$ or metrics). Drive end 14 has a cross bore 16 in which two balls 18, 20 are retained by conventional coining operations at each end of the cross bore to reduce the opening to less than the ball diameter. As shown in FIGS. 3-6, the cross bore is at 11.5° to a line perpendicular to the axis of the driver. This positions ball 18 closer to the end of the driver so ball 18 will first engage the side 22 of a recess 24 in a socket 26 as the driver moves into the socket recess.

As viewed in the drawings, an axial groove 32 intersects the cross bore. The groove lies in the middle of the flat drive face 34 and has a depth which when added to the length of the cross bore (measured from the bottom of the groove) is equal to the combined diameters of the two balls 18, 20. This permits the balls to lie wholly between the two opposed drive faces when the control tab 40 is moved to position the lock portion 36 in an unobstructing position. When the lock 36 is in the obstructing position shown in FIGS. 3 and 5, ball 18 further from the tab must project to a lock position beyond the flat face of the drive end. When the driver is inserted into the recess of a wrench socket, the projecting ball 18 will engage an undercut 38 in the recess 24 (as shown in FIG. 5) and the lock 36 will be backed up by the opposite wall of the recess to positively lock the socket in the extension until the lock 36 is manually withdrawn.

Tab 40 is integral with the reduced diameter portion 46 of sleeve 42 and is formed to position the lock 36 as described. The sleeve is formed to provide an inside shoulder 47 and groove 52. The right end of the sleeve is formed inwardly to capture the spring 54 inside the sleeve 42. The right end of the spring has a tight coil received in a groove 56 in the extension so the other end of the spring bears against shoulder 47. This biases the sleeve to the left so lock tab 36 will normally lie in the groove 32. When the sleeve is pulled back (right) the tab 36 is moved away from the balls to permit the socket to be removed.

When the parts are assembled, the balls 18, 20 are placed in the cross bore 16 and the ends of the bore are then coined. The spring 54 is then placed inside the sleeve. The loose assembly is then moved onto the cylindrical end of the extension until the reduced diameter end loop of the spring snaps into groove 56. This is a permanent assembly. The only way to now remove the sleeve is to destroy it. The spring limits movement of the sleeve. Sleeve movement to the left is limited by end 60 engaging the spring loop engaged in the groove. Spring movement to the right is limited by front end 58 closing (stacking) the spring loops against the spring loop captured in the groove 56.

The sleeve 42 has enough clearance on the driver to allow the sleeve to rock on the driver which means the lock tab can be moved into position to be engaged by the socket. This coupled with the angle disposition of the cross bore, makes it possible to push the socket onto the driver. Thus, as shown in FIG. 3, the ball 18 projects from the cross bore because tab 36 is self-biased to press down on ball 20. The entry into the socket recess 24 is slightly beveled or chamfered. This will cam the ball 18 (a sharp corner would also cam the ball) to push the balls 18, 20 upwardly and move tab 36 upwardly. The end of tab 36 will strike the bevel or face of the socket and will push tab 36 to the right relative to the driver extension as the driver end enters the recess. This pushes the sleeve to the right, compressing spring 54 as shown in FIG. 4. When the ball 18 reaches the undercut, the spring 54 forces the tab 35 to the left to force the balls 18, 20 down so ball 18 engage the undercut 38. This locks the socket in the driver until the sleeve is manually retracted to allow the balls to move into the cross bore and permit the socket to be removed. The socket has been mounted simply by pushing it on the end of the extension. The spring acts on the sleeve to always bias the tab into the groove.

The reduced diameter portion 46 can be any desired length to allow adequate finger room between the sleeve and the socket.

I claim:

1. A socket wrench driver provided with a push-on/quick release locking arrangement comprising, a drive end on said driver having an even number of flat drive surfaces and having an axis, a cross bore through the drive end intersecting opposed flat surfaces, said cross bore having an axis and an end at each of said opposed flat surfaces intersected by said bore, lock means mounted in said bore having a length generally equal to the distance between said opposed surfaces, an axial groove in one of said opposed flat surfaces, the axis of said cross bore being angled relative to a line perpendicular to an axis of the driver so the end of the bore at the other of said opposed surfaces is closer to an end of the driver, means retaining said lock means relative to said bore while allowing limited projection of the lock means to a lock position beyond said other surfaces, an axially movable sleeve mounted on said driver for movement between a locked position and a released position, said sleeve having an interior groove having axially spaced front and rear walls, a control tab projecting forwardly from said sleeve into said axial groove, said control tab including a lock tab in said axial groove operative to obstruct movement of said lock means into said groove when the sleeve is in a locked position whereby the lock means projects from said other of said opposed flat surfaces, said lock tab being retracted from said locked position when said sleeve is moved to its released position whereby said lock tab no longer obstructs said lock means and the lock means can move into the bore, a spring mounted in said interior groove in said sleeve and bearing against said front wall interior groove to bias said sleeve to said locked position, said sleeve having enough clearance on said driver to accommodate some rocking of the sleeve on the driver whereby the lock tab can be raised by said lock means when said lock means is moved into said cross bore.

2. A socket wrench driver according to claim 1 including, an annular groove in the driver near said drive end, a loop of said spring remote from the drive end being engaged in said annular groove, movement of the sleeve toward said drive end being limited by engagement of said rear wall with said spring loop.

* * * * *

UNITED STATES PATENT AND TRADEMARK OFFICE
CERTIFICATE OF CORRECTION

PATENT NO. : 4,770,073

DATED : September 13, 1988

INVENTOR(S) : Bernhard Palm

It is certified that error appears in the above-identified patent and that said Letters Patent is hereby corrected as shown below:

Column 2, line 23, the words "drive end" should read --driver--.

Column 2, line 23, the word "driver" should read --drive end--.

Column 2, line 28, the word "extension" should read --driver--.

Column 3, line 1, delete the word "extension".

Signed and Sealed this

Twenty-first Day of August, 1990

Attest:

HARRY F. MANBECK, JR.

Attesting Officer

Commissioner of Patents and Trademarks